US010387262B1

(12) United States Patent
Chikkanayakanahally et al.

(10) Patent No.: US 10,387,262 B1
(45) Date of Patent: Aug. 20, 2019

(54) FEDERATED RESTORE OF SINGLE INSTANCE DATABASES AND AVAILABILITY GROUP DATABASE REPLICAS

(71) Applicant: EMC Corporation, Hopkinton, MA (US)

(72) Inventors: Manjesh Venkatanarayana Chikkanayakanahally, Bangalore (IN); Sunil Yadav, Bangalore (IN); Elango Chockalingam, Bangalore (IN); Anupam Chakraborty, Bangalore (IN)

(73) Assignee: EMC IP HOLDING COMPANY LLC, Hopkinton, ME (US)

( * ) Notice: Subject to any disclaimer, the term of this patent is extended or adjusted under 35 U.S.C. 154(b) by 702 days.

(21) Appl. No.: 14/661,604

(22) Filed: Mar. 18, 2015

Related U.S. Application Data (63) Continuation-in-part of application No. 14/317,203, filed on Jun. 27, 2014, now Pat. No. 9,405,634.

(51) Int. Cl.
*G06F 11/00* (2006.01)
*G06F 11/14* (2006.01)

(52) U.S. Cl.
CPC ...... *G06F 11/1451* (2013.01); *G06F 11/1458* (2013.01); *G06F 11/1461* (2013.01); *G06F 2201/84* (2013.01)

(58) Field of Classification Search
CPC ............ G06F 11/1461; G06F 11/1464; G06F 11/1458; G06F 11/1469; G06F 16/128; G06F 16/11; G06F 16/27

USPC ................. 707/638, 640, 655, 656
See application file for complete search history.

(56) References Cited

U.S. PATENT DOCUMENTS

| | | | |
|---|---|---|---|
| 8,140,791 B1 * | 3/2012 | Greene | G06F 11/1464 711/162 |
| 9,069,482 B1 | 6/2015 | Chopra | |
| 2003/0182253 A1 * | 9/2003 | Chen | G06F 17/30067 |
| 2005/0076070 A1 * | 4/2005 | Mikami | G06F 17/30215 |
| 2006/0200505 A1 * | 9/2006 | Bhatia | G06F 11/1458 |
| 2007/0106713 A1 * | 5/2007 | Allen | G06F 1/182 |
| 2008/0052327 A1 * | 2/2008 | Buah | G06F 11/1482 |
| 2008/0104145 A1 * | 5/2008 | Lipman | G06F 11/1456 |
| 2010/0293147 A1 * | 11/2010 | Snow | G06F 17/30067 707/640 |

(Continued)

*Primary Examiner* — Thu Nguyet T Le
(74) *Attorney, Agent, or Firm* — Dergosits & Noah LLP; Todd A. Noah (57) ABSTRACT

A system identifies availability group database replicas and a single instance database scheduled for backup. The system configures backup storage based on an identifier of a cluster of nodes associated with the availability group database replicas. The system backs up the availability group database replicas based on their corresponding preferred nodes and the single instance database from a node in the cluster of nodes based on the identifier of the cluster of nodes. The system outputs information associated with the single instance database and a database replica in any availability group that is backed up based on the identifier of the cluster of nodes in response to a user request for the information. The system restores a user-selected single instance database and/or a user-selected database replica to a user-selected node in the cluster of nodes based on a user selecting at least some of the information.

20 Claims, 4 Drawing Sheets

(56) References Cited

U.S. PATENT DOCUMENTS

| | | | | |
|---|---|---|---|---|
| 2012/0158882 A1* | 6/2012 | Oehme | ................ | G06F 19/321 |
| | | | | 709/213 |
| 2013/0066838 A1* | 3/2013 | Singla | ................ | G06F 11/1448 |
| | | | | 707/679 |
| 2014/0244822 A1* | 8/2014 | Ban | ........................ | H04L 41/00 |
| | | | | 709/223 |

* cited by examiner

FEDERATED RESTORE OF SINGLE INSTANCE DATABASES AND AVAILABILITY GROUP DATABASE REPLICAS

This application is a continuation-in-part of U.S. patent application Ser. No. 14/317,203, filed Jun. 27, 2014, the entire contents of which are incorporated herein by reference.

BACKGROUND

If a software error corrupts a data object, or if erroneous data updates the data object, a data protection administrator may restore the data object to a previous state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

Some structured query language servers, such as Microsoft's SQL Server 2012, include an "Always On" availability group, which is a high-availability and disaster-recovery solution that provides an enterprise-level alternative to database mirroring. An availability group maximizes the availability of a set of user databases for an enterprise, and supports a failover environment for a discrete set of user databases, known as availability databases, that fail over together from one server, or node, in a cluster to another server, or node, in the cluster. An availability group supports a set of read-write primary replicas of a database and other sets of corresponding secondary replicas of the database. Secondary replicas may be made available for read-only access and/or some backup operations. A system administrator may specify availability group properties, such as backup preference among primary replicas and secondary replicas for running backup jobs, which can thereby improve backup performance.

Consequently, when a backup application is scheduled to back up a replica of a database in an availability group, the backup application needs to determine whether the current node in a cluster is the preferred node for backing up the replica. Therefore, as an example, SQL Server 2012 exposes a procedure sys.fn_hadr_backup_is_preferred_replica which takes a database replica name as an input and returns whether a current node is the preferred node to be used for backing up the replica.

DETAILED DESCRIPTION

A web application framework and platform, such as Microsoft Sharepoint®, may store data in availability group database replicas and in single instance databases which are not availability group database replicas, such as an administration database and a configuration database. A web application framework may use a volume snapshot service, such as Microsoft® Volume Shadow Copy Service, to simplify backup and restore operations. While a volume snapshot service may enable a requestor to select all databases, some databases, or a single database for backup and/or restore operations, some challenges exist for restoring single instance databases and availability group database replicas.

Backup applications offer no options to restore a backup to a node other than the node from which the backup was created because the backup application assumes that a backup from a node will always be restored to the same node, whereas a backup of an availability group database replica from one node in a cluster may need to be restored to a different node in the cluster in response to a system administrator changing the availability group properties. Since backup applications store backups based on the node from which the backup was created, backup applications do not allow a user who backed up an availability group database replica from one node to view information about backups from other nodes, even though the other nodes may be in the same cluster as the node from which the user created the backup of the availability group database replica. Although backup applications offer a copy restore option that enables a user to restore a database replica created from a different node than the node from which the user created a backup, the copy restore option is limited to restoring a single database replica at a time and also requires the user to set the properties before performing the restoration of each individual database replica.

Additionally, the copy restore option creates an additional copy of a database replica in a node, such that the node may continue to retain a previous version of the database replica in addition to the additional copy of the database replica, which wastes storage on the node and may cause confusion. If a backup application begins to restore a database replica to a first instance of an availability group in one node, the replication applied to all of the instances of the availability groups distributed across various nodes is temporarily broken, such that data saved to one of the other instances during the restore process is lost when the other instance is subsequently overwritten during the restore process. Furthermore, a user backing up and restoring availability groups for a web application framework which stores data in single instance databases and in availability group database replicas has to use one user interface for backing up and restoring single instance databases and use another user interface for backing up and restoring availability group database replicas, possibly creating confusion and errors when switching between the user interfaces.

Embodiments herein provide federated restore of single instance databases and availability group database replicas. Multiple availability group database replicas and a single instance database are identified as scheduled for backup. Backup storage is configured based on an identifier of a cluster of nodes associated with the multiple availability group database replicas. The first availability group database replica is backed up based on the preferred node for the first availability group database replica and the second availability group database replica is backed up based on a preferred node identified for the second availability group database replica. The single instance database is backed up from a node in a cluster of nodes based on the identifier of the cluster of nodes. Information associated with the single instance database and a database replica in any availability group which is backed up based on the identifier of the cluster of nodes is output in response to a user request for the information. A user-selected single instance database and/or a user-selected database replica is restored to a user-selected node in the cluster of nodes based on a user selecting at least some of the information.

For example, a backup application identifies an availability group database replica 1, an availability group database replica 2, and a single instance database scheduled for backup. The backup application configures backup storage based on the name of the cluster of nodes associated with the availability group database replicas 1 and 2. The backup application backs up the availability group database replica 1 based on the preferred node for the availability group database replica 1 and backs up the availability group database replica 2 based on the preferred node identified for the availability group database replica 2. The backup application backs up the single instance database from node 1 in the cluster of nodes based on the name of the cluster of nodes associated with the availability group database replicas 1 and 2. The backup application outputs information associated the single instance database from node 1 and with database replicas A and B in availability group 1 which are backed up based on the name of the cluster of nodes associated with the availability group database replicas 1 and 2, in response to a user request for the information. The backup application restores a user-selected single instance database to node 1 and restores a user-selected database replica A in a backup of availability group 1 from node 1 to a user-selected node 2 in the cluster based on a user selecting the cluster name, the single instance database, node 1, database replica A in availability group 1, and node 2. The backup application allows a user who backed up an availability group database replica from one node to view information about backups from other nodes, including backups of single instance databases. The backup application overwrites any existing version of the database replica restored to a node rather than creating an additional copy of the database replica in the node, and may restore a backup to a node other than the node from which the backup was created.

Furthermore, a user backing up and restoring availability group database replicas for a web application framework which stores data in single instance databases and in availability group database replicas can use the same user interface for backing up and restoring single instance databases and for backing up and restoring availability group database replicas, thereby eliminating the need to switch between different user interfaces. Therefore, the backup application is not directed to an abstract idea because the backup application does not merely perform some business practice known from the pre-Internet or pre-computer world along with the requirement to perform the business practice on the Internet or a computer. Instead, the backup application is necessarily rooted in computer technology in order to overcome a problem specifically arising in the realm of computer networks, namely having to use one user interface for backing up and restoring single instance databases and having to use another user interface for backing up and restoring availability group database replicas.

Figure 1:
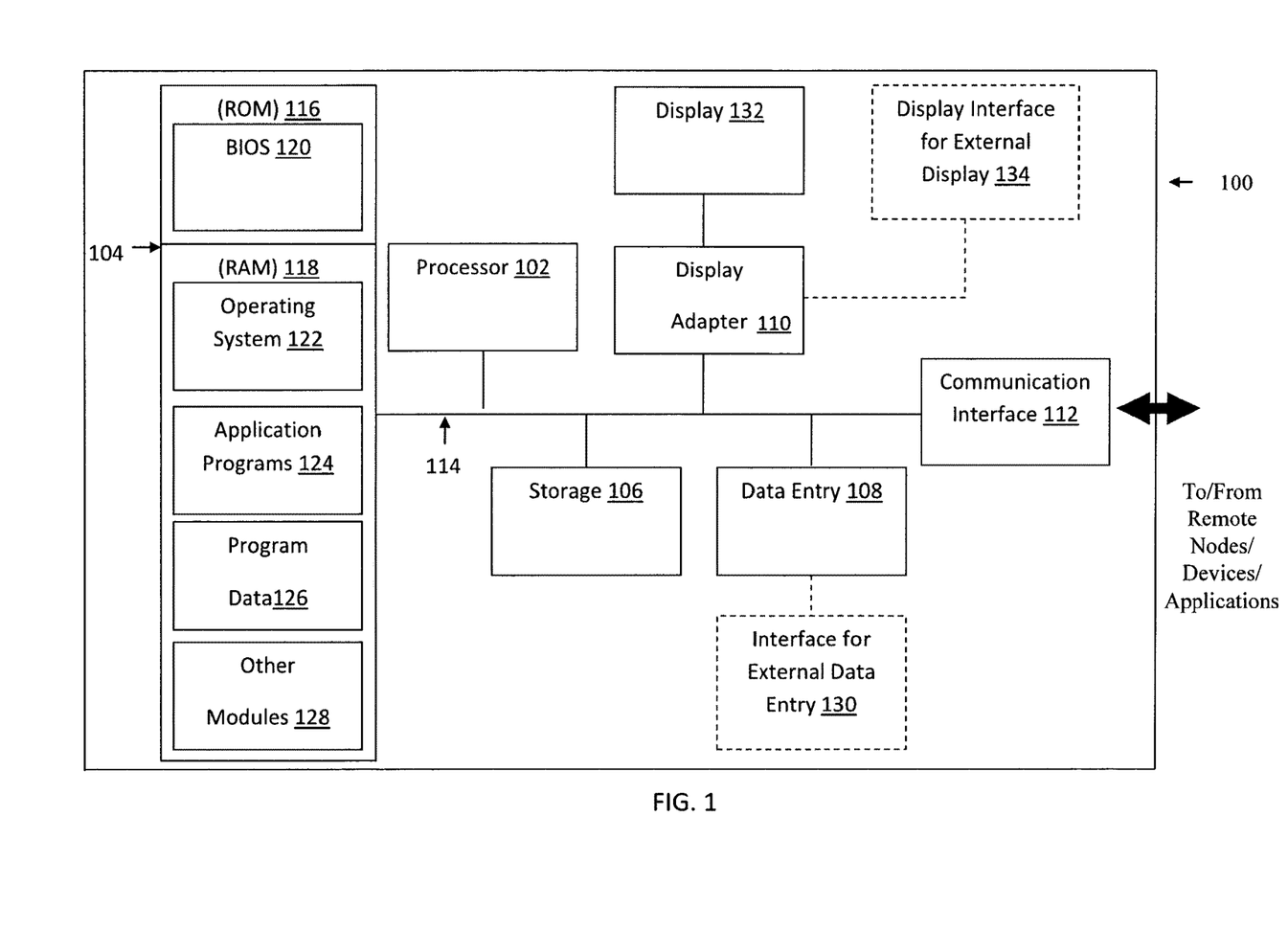
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

In the prior art, challenges exist with restoring backed up availability group database replicas. Backup applications offer no options for a normal restore of a backup to a node other than the node from which the backup was created. Backup applications do not allow a user who backed up an availability group database replica from one node to view information about backups from other nodes, even though the other nodes may be in the same cluster as the node from which the user created the backup of the availability group database replica. The copy restore option is limited to restoring a single database replica at a time, requires the user to set the properties before performing the restoration of each individual database replica, and creates an additional copy of a database replica in a node, which wastes storage on the node and may cause confusion. Data saved to one instance during the restore process is lost when the instance is subsequently overwritten during the restore process. Furthermore, a user backing up and restoring availability group database replicas for a web application framework which stores data in single instance databases and in availability group database replicas has to use one user interface for backing up and restoring single instance databases and use another user interface for backing up and restoring availability group database replicas, possibly creating confusion and errors when switching between the user interfaces.

Embodiments herein provide federated restore of single instance databases and availability group database replicas. A backup application allows a user who backed up an availability group database replica from one node to view information about backups from other nodes, including backups of single instance databases. The backup application overwrites any existing version of the database replica restored to a node rather than creating an additional copy of the database replica in the node, and may restore a backup to a node other than the node from which the backup was created. Furthermore, a user backing up and restoring availability group database replicas for a web application framework which stores data in single instance databases and in availability group database replicas can use the same user interface for backing up and restoring single instance databases and for backing up and restoring availability group database replicas, thereby eliminating the need to switch between different user interfaces.

Figure 2:
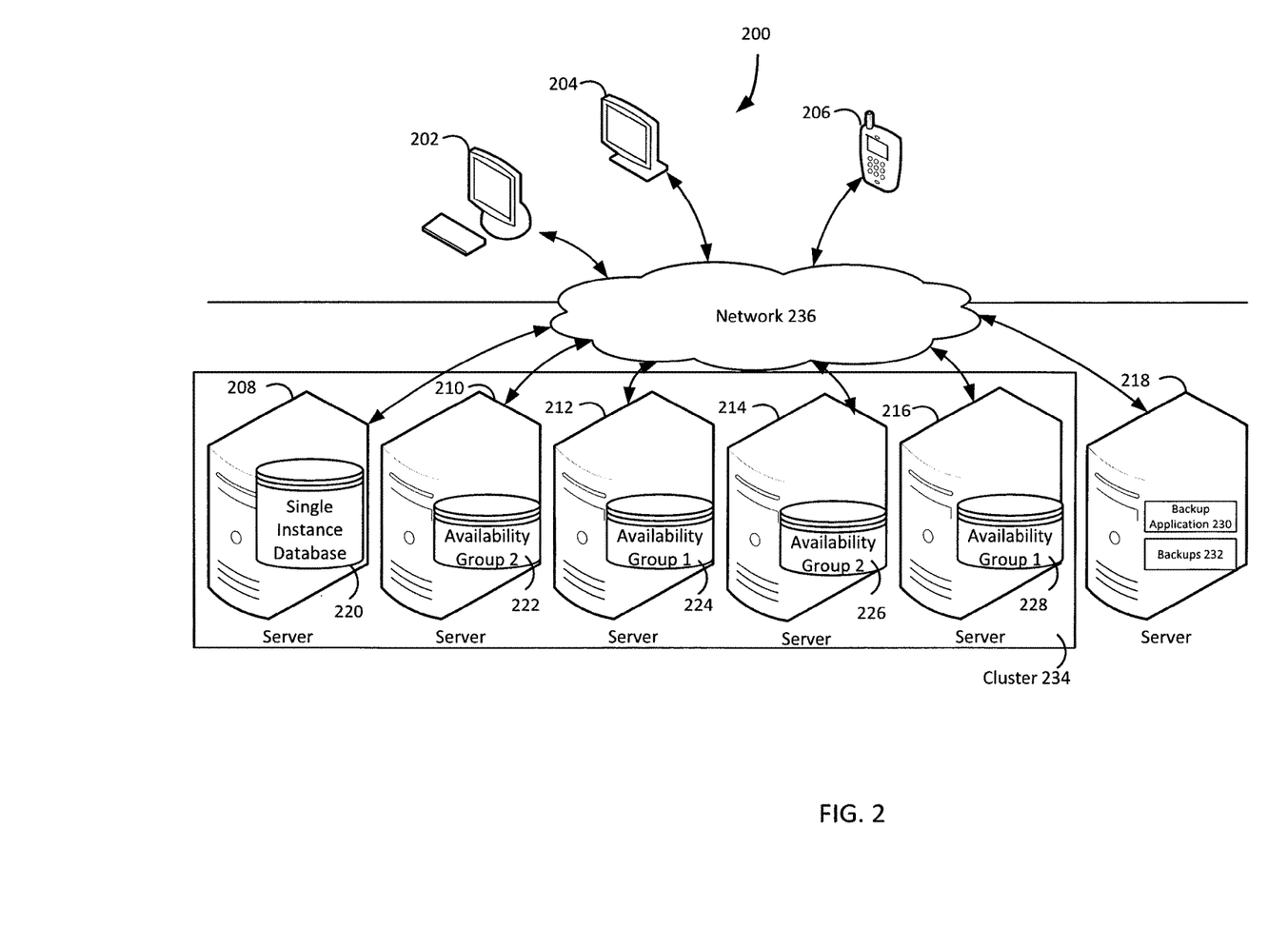
FIG. 2 illustrates a block diagram of an example system for federated restore of single instance databases and availability group database replicas, under an embodiment.

FIG. 2 illustrates a block diagram of a system that implements federated restore of single instance databases and availability group database replicas, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, a third server 212, a fourth server 214, a fifth server 216, and a sixth server 218 that may be provided by a hosting company. The first server 208 includes a single instance database 220, which is not an availability group database replica, such as an administration database or a configuration database. The second server 210 includes a primary availability group 2 222, the third server 212 includes a primary availability group 1 224, the fourth server 214 includes a secondary availability group 2 226, the fifth server 216 includes a secondary availability group 1 228, and the sixth server 218 includes a backup application 230 and backups 232.

Although FIG. 2 depicts the backups 232 residing on the sixth server 218, the backups 232 may be stored elsewhere, such as on another server or on a storage array, which are not depicted in FIG. 2. The servers 208-216 comprise a cluster 234, which does not include the sixth server 218. Therefore, the servers 208-216 may be referred to as the nodes 208-216 in the cluster 234. The clients 202-206 and the servers 208-218 communicate via a network 236. Although FIG. 2 depicts the system 200 with three clients 202-206, six servers 208-218, one single instance database 220, four availability group instances 222-228, one backup application 230, one set of backups 232, one cluster 234, and one network 236, the system 200 may include any number of clients 202-206, any number of servers 208-218, any number of single instance databases 220, any number of availability group instances 222-228, any number of backup applications 230, any number of sets of backups 232, any number of clusters 234, and any number of networks 236. The clients 202-206 and the servers 208-218 may each be substantially similar to the system 100 depicted in FIG. 1.

FIG. 2 depicts the backup application 230 residing completely on the sixth server 218, but the backup application 230 may reside completely on any of the servers 208-216, completely on any of the clients 202-206, completely on another server that is not depicted in FIG. 2, or in any combination of partially on the servers 208-218, partially on the clients 202-206, and partially on the other server.

The backup application 230 may be, for example, EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server.

Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described herein apply to EMC Corporation's NetWorker® backup application, one of skill in the art would recognize that other backup applications and their corresponding functionalities may be used. The backup application 230 may also be implemented as a NetWorker® Module For Microsoft Applications, which, as stated above, may reside completely on any of the servers 208-218, completely on any of the clients 202-206, completely on another server that is not depicted in FIG. 2, or in any combination of partially on the servers 208-218, partially on the clients 202-206, and partially on the other server.

The backup application 230 identifies multiple availability group database replicas and a single instance database that are scheduled to back up a database replica. For example, the backup application 230 identifies an availability group database replica 1, an availability group database replica 2, and the single instance database 220 scheduled for backup, discovers that the server 214 is the active node for the cluster 234, and makes the node 214 the coordinating node for the federated backup. The backup application 230 may start the backup using nsrjobd to send a job request to nsrexecd on the cluster server alias, the node 214, which forwards the job request to nsrsqlsv for further processing.

When the backup application 230 is scheduled to back up a replica of a database for an availability group, the backup application must first determine if the active node for a cluster includes the availability group database replica. For example, if the backup application 230 is scheduled to back up the availability group database replica 2, the backup application 230 determines if the active node 214 for the cluster 234 includes the availability group database replica 2 by identifying any structured query language instances on the active node 214. If the active node does not include the identified availability group database replica, the backup application 230 identifies an owner node for the identified availability group database replica and triggers a process on the owner node, which converts the owner node into the active node. For example, if the third server 212 is the active node and the third server 212 does not include any instances of the availability group database replica 2, the backup application 230 runs a powershell query (Get-Cluster-Group) to identify the second server 210 as the owner of the availability group database replica 2, and triggers a process on the second server 210, which converts the second server 210 to the active node 210 for the cluster 234.

If the current node is the active node, the backup application 230 logs into a structured query language instance on the active node. For example, the backup application 230 logs into the primary availability group 2 222 on the second server 210, which is the active node 210 for the cluster 234. Then the backup application 230 identifies a primary replica for an availability group identified for backup. For example, the backup application 230 identifies the primary availability group 2 222 as including the primary replica for the availability group 2 by using a sys.dm_hadr_availability_group_states table. Next, the backup application 230 identifies a backup preference for an availability group based on a primary replica. For example, the backup application 230 identifies the fourth server 214, which include the secondary availability group 2 226, as the backup preference for the availability group 2 based on the primary replica by using the sys.availability_groups table.

The backup preference for an availability group database replica may identify the primary replica only, identify secondary replicas only, identify a secondary replicas preference, or identify an any replicas preference. If the backup preference identifies the primary replica only, the backup application 230 identifies the server which includes the primary availability group database replica as the preferred node for backing up the availability group database replica, as the primary replica is always on-line, processing the most current data for its databases.

If the backup preference identifies the secondary replica only, the backup application 230 ignores the primary replica and identifies all of the secondary replicas in their order of priority by using the sys.availability_replicas table, and the backup application 230 identifies the server which includes the on-line replica with the highest priority as the preferred node for backing up the availability group database replica.

If the backup preference identifies a secondary replica preference, the backup application 230 ignores the primary replica and identifies all of the secondary replicas in their order of priority by using the sys.availability_replicas table, and the backup application 230 identifies the server which includes the on-line secondary replica with the highest priority as the preferred node for backing up the availability group database replica. If none of the secondary replicas is on-line, the backup application 230 identifies the server which includes the primary availability group database replica as the preferred node for backing up the availability group database replica.

If the backup preference identifies an any replicas preference, the backup application 230 identifies all of the replicas in their order of priority by using the sys.availability_replicas table, and the backup application 230 identifies the server which includes the on-line replica with the highest priority as the preferred node for backing up the availability group database replica.

Having identified a backup preference, the backup application 230 determines whether the backup preference is on-line, and is therefore processing the most recent data for any database replicas that are part of its availability group for the backup preference node. For example, the backup application 230 attempts to log in to the fourth server 214, which includes the secondary availability group 2 226. If the node identified as the backup preference is on-line, the backup application 230 identifies the backup preference as the preferred node for backing up the availability group database replica. For example, the backup application 230 identifies the fourth server 214, which includes the secondary availability group 2 226, as the preferred node for backing up the availability group database replica 2 based on the secondary availability group 2 226 on the fourth server 214 being on-line.

Next, the backup application 230 configures backup storage based on an identifier of a cluster of nodes associated with the multiple availability group database replicas scheduled for backup. For example, the backup application 230 configures the storage for the backups 232 based on the name of cluster 234, which includes availability group database replica 1 and availability group database replica 2.

Then the backup application 230 backs up a first availability group database replica based on the preferred node for the first availability group database replica and backs up a second availability group database replica based on the preferred node identified for the second availability group database replica. For example, the backup application 230 backs up the availability group database replica 1 based on the preferred node 216 for the availability group database replica 1 in parallel with backing up the availability group database replica 2 based on the preferred node 214 identified for the availability group database replica 2, which speeds up the backup process, which stores the backups 232. These federated backups can be performed in parallel at the level of database replicas within availability groups. The backup application 230 also backs up a single instance database from a node in a cluster based on an identifier of the cluster. For example, the backup application 230 backs up the single instance database 220 from the node 208 in the cluster 234 based on the name of the cluster 234. In the prior art, the single instance database 220 from the node 208 would be backed up based on the node 208, not the name of the cluster 234.

The following procedure describes how the backup application 230 may back up multiple availability group database replicas in parallel. The nsrsqlsv makes itself a creator job, and sends the backup request with the appropriate commands for the availability group database replica 1 based on the preferred node 216 and the availability group database replica 2 based on the preferred node 214 in parallel through nsrjobd. This new job request is send to nsrexecd on the node 216, and nsrexecd forwards the job request to nsrsqlsv to back up the availability group database replica 1 on the node 216. In parallel with the first new job request, another new job request is send to nsrexecd on the node 214, and nsrexecd forwards the job request to nsrsqlsv to back up the availability group database replica 2 on the node 214. From the command, nsrsqlsv on the node 216 understands that it will now act in a slave process capacity, meaning that nsrsqlsv will not process this command further for cluster aware processing. Instead, nsrsqlsv returns the backup completion message to the coordinating node. Similarly, backup is completed in slave node 214 and its backup completions message is also returned to the coordinating node. Upon receiving the backup completion messages from the slave nodes 214 and 216, the nsrsqlsv on the coordinating node sets a completion message for the save group which includes that availability group database replica s 1 and 2.

Information associated with a single instance database and with a database replica in any availability group which is backed up based on the identifier of a cluster is output in response to a user request for the information. For example, the backup application 230 enables a user to select the node 208 as the destination where the single instance database 220 will be restored, to select the node 214 as the destination where the availability group database replicas will be restored, to select the name of the cluster 234 out of multiple cluster names which the backup application 230 used as the basis for backing up the single instance database 220 and the availability group database replicas, and to select the node 208 and the node 216 as the sources for the restoration. The backup application 230 enables the user to browse and select for restoration the single instance database 220 which was stored from node 208 and to select for restoration the availability group database replicas for database A and database B which were stored from the node 216 based on the name of the cluster 234, and enables the user to set the properties for any number of selected availability group database replicas without having to individually set the property for each selected availability group database replica. The backup application 230 allows a user who backed up a single instance database from one node and backed up an availability group database replica from another node to view information about backups from all nodes in the cluster.

The backup application 230 may perform a full backup of a user-selected node prior to restoring a user-selected availability group database replica to the user-selected node in the cluster. For example, when the backup application 230 begins to restore the database replicas for the database A and the database B to the availability group 1 228 in the node 216, the replication applied to the availability group 1 228 in the node 216 and the availability group 1 224 in the node 212 is temporarily broken. Consequently, data stored to the availability group 1 224 in the node 212 during the restore of the availability group database replicas for the database A and the database B to the availability group 1 228 in the node 216 could be lost when the backup application 230 subsequently overwrites the availability group database replicas for the database A and the database B to the availability group 1 224 in the node 212 during the restore process. Therefore, the backup application 230 performs a full backup of the availability group database replicas for the database A and the database B in the availability group 1 224 in the node 212 before the backup application 230 overwrites the availability group database replicas for the database A and the database B in the availability group 1 224 in the node 212. The full backup saves the data stored to the availability group 1 224 in the node 212 during the restore of the availability group database replicas for the database A and the database B to the availability group 1 228 in the node 216.

A user-selected single instance database and/or a user-selected database replica is restored to a user-selected node in the cluster based on a user selecting at least some of the information. For example, the backup application 230 restores the user-selected single instance database 220 to the user-selected node 208 based on the user selecting the name of the cluster 234, the single instance database 220, and the node 208. In another example, the backup application 230 restores the user-selected availability group database replicas of database A and database B in the backup of the availability group 1 228 from node 216 to the user-selected node 214 based on the user selecting the name of the cluster 234 and the availability group database replicas for database A and database B in the availability group 1, wherein the user-selected node 214 previously lacked any version of the user-selected availability group database replicas of database A and database B.

In yet another example, the backup application 230 restores the user-selected availability group database replicas of database A and database B in the backup of the availability group 1 228 from node 216 to the user-selected nodes 212 and 216 by overwriting existing versions of the user-selected availability group database replicas of database A and database B in the nodes 212 and 216. If the backup application 230 performed a full backup of the availability group database replicas for the database A and the database B in the availability group 1 224 in the node 212, the backup application 230 overwrites the availability group database replicas for the database A and the database B to the availability group 1 224 in the node 212 based on the full backup of the availability group database replicas for the database A and the database B to the availability group 1 224 in the node 212. The backup application 230 saves the data stored to the availability group 1 224 in the node 212 during the restore of the availability group database replicas for the database A and the database B to the availability group 1 228 in the node 216.

Figure 3A:
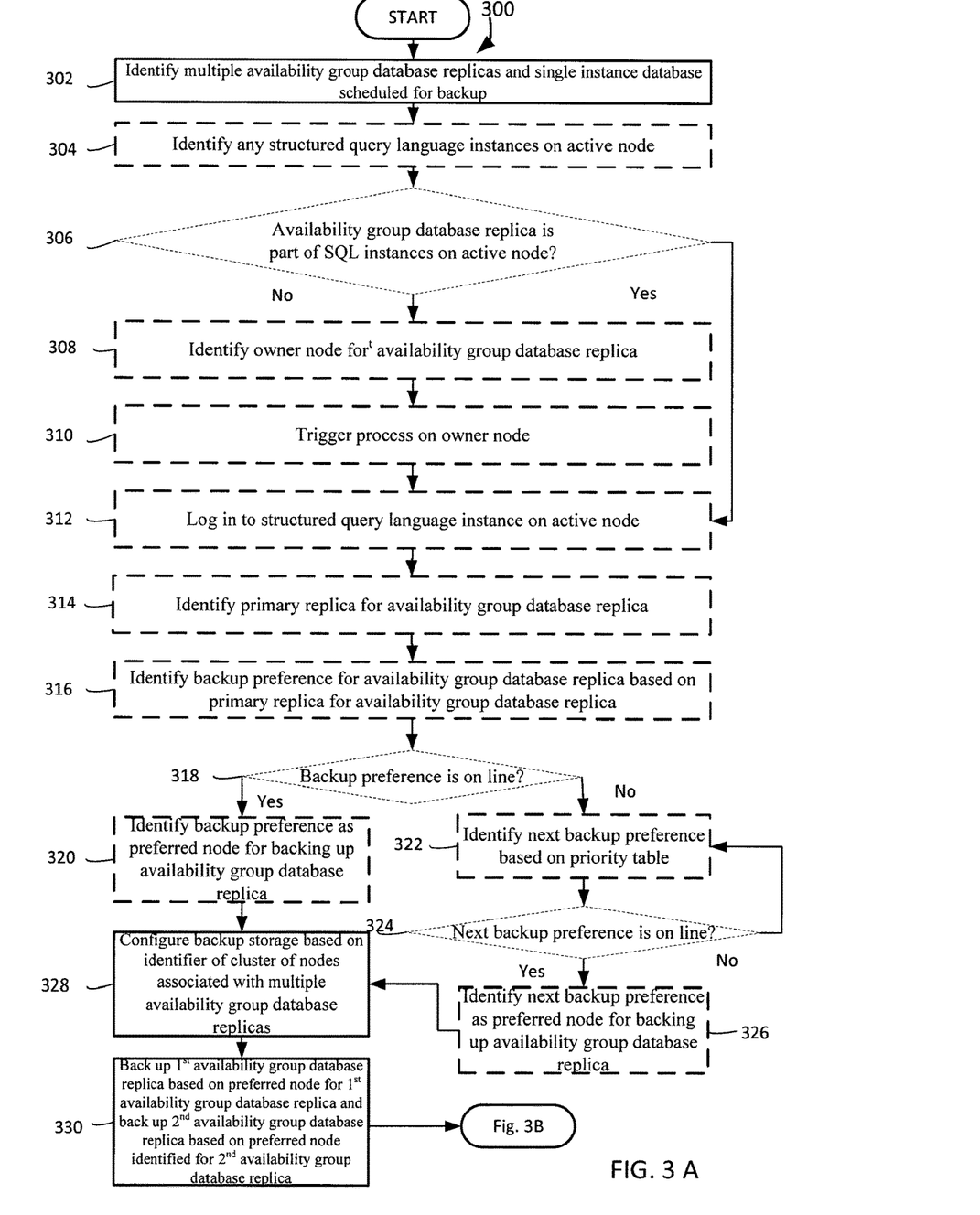
FIG. 3A and FIG. 3B are flowcharts that illustrates a method for federated restore of single instance databases and availability group database replicas, under an embodiment.
Figure 3B:
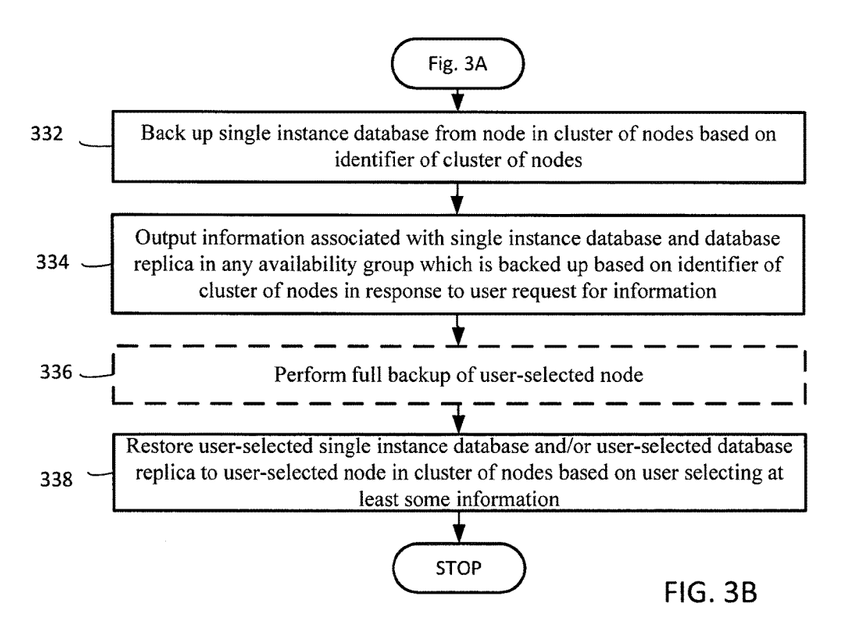

FIG. 3 is a flowchart that illustrates a method for federated restore of single instance databases and availability group database replicas, under an embodiment. Flowchart 300 illustrates method acts illustrated as flowchart blocks for certain steps involved in and/or between the clients 202-206 and/or the servers 208-218 of FIG. 2.

The backup application 230 begins by identifying multiple availability group database replicas and a single instance database that are scheduled for back up, block 302. For example, the backup application 230 identifies the availability group database replica 1, the availability group database replica 2, and the single instance database 220 scheduled for backup, discovers that the server 214 is the active node for the cluster 234, and makes the node 214 the coordinating node for the federated backups. Having identified multiple availability group database replicas that are scheduled for back up, the backup application 230 may also identify any structured query language instances on the active node, block 304. For example, the backup application 230 identifies the availability group 2 226 on the active node 214.

Having identified any SQL instances on the active node, the backup application 230 may determine whether an availability group database replica identified for backup is part of the SQL instances on the active node, block 306. For example, the backup application 230 determines if the active node 214 for the cluster 234 includes the availability group database replica 2. If the availability group database replica identified for backup is not part of the SQL instances on the active node, the flowchart 300 continues to block 308. If the availability group database replica identified for backup is part of the SQL instances on the active node, the flowchart 300 proceeds to block 312.

If the availability group database replica identified for backup is not part of the SQL instances on the active node, the backup application 230 may identify the owner node for the availability group database replica, block 308. For example, the backup application 230 runs a powershell query (Get-Cluster-Group) to identify the second server 210 as the owner of the availability group database replica 2. Having identified the owner node for the availability group database replica, the backup application 230 may trigger a process on the owner node, block 310. For example, the backup application 230 triggers a process on the second server 210, which converts the second server 210 to the active node 210 for the cluster 234.

Having identified the active node and the availability group database replica, the backup application 230 optionally logs into a SQL instance on the active node, block 312. For example, the backup application 230 logs into the primary availability group 2 222 on the second server 210, which is the active node 210 for the cluster 234. Having logged into a SQL instance on the active node, the backup application 230 optionally identifies the primary replica for the availability group database replica, block 314. For example, the backup application 230 identifies the primary availability group 2 222 as including the primary replica for the availability group 2 by using a sys.dm_hadr_availability_group_states table.

Having identified the primary replica for the availability group, the backup application 230 optionally identifies the backup preference for the availability group database replica based on the primary replica for the availability group database replica, block 316. For example, the backup application 230 identifies the fourth server 214, which include the secondary availability group 2 226, as the backup preference for the availability group database replica 2 based on the primary replica for the availability group database replica 2 by using the sys.availability_groups table. After identifying the backup preference, the backup application 230 optionally checks whether the backup preference is on-line, block 318. For example, the backup application 230 attempts to log in to the fourth server 214, which includes the secondary availability group 2 226. If the backup preference is on-line, the flowchart 300 continues to block 320. If the backup preference is not on-line, the flowchart 300 proceeds to block 322.

If the backup preference is on-line, the backup application 230 optionally identifies the backup preference as the preferred node for backing up the availability group database replica, block 320. For example, the backup application 230 identifies the fourth server 214, which includes the secondary availability group 2 226, as the preferred node for backing up the availability group database replica 2 based on the secondary availability group 2 226 on the fourth server 214 being on-line. Then the flowchart 300 proceeds to block 328. If the backup preference is not on-line, the backup application 230 may identify the next backup preference based on the priority table, block 322. For example, if the backup preference is not on-line, the backup application 230 identifies all of the replicas in their order of priority by using the sys.availability_replicas table, Having identified the next backup preference based on the priority table, the backup application 230 may check whether the next backup preference is on-line, block 324. For example, the backup application 230 logs into the primary availability group 2 222 on the second server 210, which is the active node 210 for the cluster 234. If the next backup preference is on-line, the flowchart 300 continues to block 326. If the next backup preference is not on-line, the flowchart 300 returns to block 322 to identify the next in priority backup preference based on the priority table. If the next backup preference is on-line, the backup application 230 may identify the next backup preference as the preferred node for backing up the availability group database replica, block 326. For example, the backup application 230 identifies the second server 210, which includes the primary availability group 2 222, as the preferred node for backing up the availability group database replica 2 based on the secondary availability group 2 226 on the fourth server 214 not being on-line.

Having identified the preferred node for backing up the availability group database replica, the backup application 230 configures backup storage based on the identifier of the cluster of nodes associated with multiple availability group database replicas scheduled for backup, block 328. For example, the backup application 230 configures the storage for the backups 232 based on the name of cluster 234, which includes the availability group database replica 1 and the availability group database replica 2. Having configured backup storage based on the identifier of the cluster of nodes associated with multiple availability group database replicas scheduled for backup, the backup application 230 backs up the first availability group database replica based on the preferred node for the first availability group database replica and backs up the second availability group database replica based on the preferred node identified for the second availability group database replica, block 330. For example, the backup application 230 backs up the availability group database replica 1 based on the preferred node 216 for the availability group database replica 1 in parallel with backing up the availability group database replica 2 based on the preferred node 214 identified for the availability group database replica 2, which speeds up the backup process.

The backup application 230 continues the backing up process by backing up a single instance database from a node in the cluster based on an identifier of the cluster, block 332. For example, the backup application 230 backs up the single instance database 220 from the node 208 in the cluster 234 based on the name of the cluster 234. After backing up the single instance database from the node in the cluster and the availability group database replicas based on an identifier of the cluster, the backup application 230 outputs information associated with the single instance database and a database replica in any availability group which is backed up based on the identifier of the cluster in response to any user request for the information, block 334. For example, the backup application 230 enables the user to browse and select for restoration the single instance database 220 which was stored in node 208 and the availability group database replicas for database A and database B which were stored from the node 216 based on the name of the cluster 234.

After outputting information associated with a single instance database and a database replica in any availability group which is backed up based on the identifier of the cluster, the backup application 230 may perform a full backup of a user-selected node prior to restoring a user-selected single instance database replica to the user-selected node in a cluster, block 336. For example, the backup application 230 performs a full backup of the availability group database replicas for the database A and the database B for the availability group 1 224 in the node 212 before the backup application 230 overwrites the availability group database replicas for the database A and the database B to the availability group 1 224 in the node 212. Having performed any optional full backup of the user-selected node, the backup application 230 restores a user-selected single instance database and/or a user-selected availability group database replica to any user-selected nodes in the cluster based on the user selecting at least some of the information, block 308. For example, the backup application 230 restores the user-selected single instance database 220 to the node 208 and restores the user-selected availability group database replicas of database A and database B in the backup of the availability group 1 228 from the node 212 to the user-selected node 214 based on the user selecting the name of the cluster 234, the single instance database 220, the node 208, the availability group database replicas for database A and database B in the availability group 1, and the node 212.

Although FIG. 3 depicts the blocks 302-338 occurring in a specific order, the blocks 302-338 may occur in another order. In other implementations, each of the blocks 302-338 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for federated restore of single instance databases and availability group database replicas, the system comprising:
a processor-based application, which when executed on a computer, will cause the processor to:
 identify a first availability group database replica scheduled for backup, a second availability group database replica scheduled for backup, an identifier of a cluster of nodes associated with the first and second availability group database replicas, and a single instance database scheduled for backup based on the identifier of the cluster of nodes;
 configure backup storage based on the identifier of the cluster of nodes;
 identify a structured query language instance executing on an active node amongst the cluster of nodes;
 access the structured query language instance to determine a preferred node for the first availability group database replica in response to determining the first availability group database replica is part of the structured query language instance executing on the active node;
 back up the first availability group database replica based on the preferred node for the first availability group database replica and back up the second availability group database replica based on a preferred node identified for the second availability group database replica;
 back up the single instance database from a node in the cluster of nodes based on the identifier of the cluster of nodes;
 output selectable information associated with (i) the single instance database, (ii) the first availability group database replica, and (iii) the second availability group database replica, the information being outputted in response to a user request for the information, the selectable information including a name of the cluster of nodes and identifiers of individual nodes within the cluster of nodes; and
 restore at least one of the single instance database, the first availability group database replica, and the second availability group database replica to a node in the cluster of nodes based on a user selecting at least some of the outputted information.

2. The system of claim 1, wherein the processor-based application, when executed, will further cause the processor to:
 log into the structured query language instance executing on the active node, the structured query language instance being an availability group;
 identify a primary replica for the first availability group database replica;
 identify a backup preference for the first availability group database replica based on the primary replica for the first availability group database replica;
 determine if the backup preference for the first availability group database replica is on-line; and
 identify the backup preference for the first availability group database replica as the preferred node for backing up the first availability group database replica in response to a determination that the backup preference for the first availability group database replica is on-line.

3. The system of claim 2, wherein the processor-based application, when executed, will further cause the processor to:
 identify any structured query language instances on the active node; and
 determine whether the first availability group database replica is part of the structured query language instances on the active node, wherein logging in to the structured query language instance on the active node is in response to a determination that the first availability group database replica is part of the structured query language instances on the active node.

4. The system of claim 3, wherein the processor-based application, when executed, will further cause the processor to:
 identify an owner node for the first availability group database replica in response to a determination that the first availability group database replica is not part of the structured query language instances on the active node, and
 trigger a process on the owner node.

5. The system of claim 2, wherein the processor-based application, when executed, will further cause the processor to:
 identify a next backup preference for the first availability group database replica based on a priority table in response to a determination that the backup preference for the first availability group database replica is not on-line;
 determine if the next backup preference for the first availability group database replica is on-line; and
 identify the next backup preference for the first availability group database replica as the preferred node for backing up the first availability group database replica in response to a determination that the next backup preference for the first availability group database replica is on-line.

6. The system of claim 1, wherein the preferred node is identified for the second availability group database replica based on:
- identifying a primary replica for the second availability group database replica;
- identifying a backup preference for the second availability group database replica based on the primary replica for the second availability group database replica;
- determining if the backup preference for the second availability group database replica is on-line; and
- identifying the backup preference for the second availability group database replica as the preferred node for backing up the second availability group database replica in response to a determination that the backup preference for the second availability group database replica is on-line.

7. The system of claim 1, wherein the processor-based application, when executed, will further cause the processor to perform a full backup of the user-selected node prior to restoring the user-selected database replica to the user-selected node.

8. A computer-implemented method for federated restore of single instance databases and availability group database replicas, the method comprising:
- identifying a first availability group database replica scheduled for backup, a second availability group database replica scheduled for backup, an identifier of a cluster of nodes associated with the first and second availability group database replicas, and a single instance database scheduled for backup based on the identifier of the cluster of nodes;
- configuring backup storage based on the identifier of a cluster of nodes;
- identifying a structured query language instance executing on an active node amongst the cluster of nodes;
- accessing the structured query language instance to determine a preferred node for the first availability group database replica in response to determining the first availability group database replica is part of the structured query language instance executing on the active node;
- backing up the first availability group database replica based on the preferred node for the first availability group database replica and backing up the second availability group database replica based on a preferred node identified for the second availability group database replica;
- backing up the single instance database from a node in the cluster of nodes based on the identifier of the cluster of nodes;
- outputting selectable information associated with (i) the single instance database, (ii) the first availability group database replica, and (iii) the second availability group database replica, the information being outputted in response to a user request for the information; and
- restoring at least one of the single instance database, the first availability group database replica, and the second availability group database replica to a node in the cluster of nodes based on a user selecting at least some of the outputted information.

9. The method of claim 8, wherein the method further comprises:
- logging into the structured query language instance executing on the active node, the structured query language instance being an availability group;
- identifying a primary replica for the first availability group database replica;
- identifying a backup preference for the first availability group database replica based on the primary replica for the first availability group database replica;
- determining if the backup preference for the first availability group database replica is on-line; and
- identifying the backup preference for the first availability group database replica as the preferred node for backing up the first availability group database replica in response to a determination that the backup preference for the first availability group database replica is on-line.

10. The method of claim 9, wherein the method further comprises:
- identifying any structured query language instances on the active node;
- determining whether the first availability group database replica is part of the structured query language instances on the active node, wherein logging in to the structured query language instance on the active node is in response to a determination that the first availability group database replica is part of the structured query language instances on the active node;
- identifying an owner node for the first availability group database replica in response to a determination that the first availability group database replica is not part of the structured query language instances on the active node, and
- triggering a process on the owner node.

11. The method of claim 9, wherein the method further comprises:
- identifying a next backup preference for the first availability group database replica based on a priority table in response to a determination that the backup preference for the first availability group database replica is not on-line;
- determining if the next backup preference for the first availability group database replica is on-line; and
- identifying the next backup preference for the first availability group database replica as the preferred node for backing up the first availability group database replica in response to a determination that the next backup preference for the first availability group database replica is on-line.

12. The method of claim 8, wherein the preferred node is identified for the second availability group database replica based on:
- identifying a primary replica for the second availability group database replica;
- identifying a backup preference for the second availability group database replica based on the primary replica for the second availability group database replica;
- determining if the backup preference for the second availability group database replica is on-line; and
- identifying the backup preference for the second availability group database replica as the preferred node for backing up the second availability group database replica in response to a determination that the backup preference for the second availability group database replica is on-line.

13. The method of claim 8, wherein the method further comprises performing a full backup of the user-selected node prior to restoring the user-selected database replica to the user-selected node.

14. A computer program product, comprising a non-transitory computer-readable medium having a computer-readable program code embodied therein to be executed by one or more processors, the program code including instructions to:
identify a first availability group database replica scheduled for backup, a second availability group database replica scheduled for backup, an identifier of a cluster of nodes associated with the first and second availability group database replicas, and a single instance database scheduled for backup based on the identifier of the cluster of nodes;
configure backup storage based on the identifier of a cluster of nodes;
identify a structured query language instance executing on an active node amongst the cluster of nodes;
access the structured query language instance to determine a preferred node for the first availability group database replica in response to determining the first availability group database replica is part of the structured query language instance executing on the active node;
back up the first availability group database replica based on the preferred node for the first availability group database replica and back up the second availability group database replica based on a preferred node identified for the second availability group database replica;
back up the single instance database from a node in the cluster of nodes based on the identifier of the cluster of nodes;
output selectable information associated with (i) the single instance database, (ii) the first availability group database replica, and (iii) the second availability group database replica, the information being outputted in response to a user request for the information; and
restore at least one of the single instance database, the first availability group database replica, and the second availability group database replica to a node in the cluster of nodes based on a user selecting at least some of the outputted information.

15. The computer program product of claim 14, wherein the program code includes further instructions to:
log into the structured query language instance executing on the active node, the structured query language instance being an availability group;
identify a primary replica for the first availability group database replica;
identify a backup preference for the first availability group database replica based on the primary replica for the first availability group database replica;
determine if the backup preference for the first availability group database replica is on-line; and
identify the backup preference for the first availability group database replica as the preferred node for backing up the first availability group database replica in response to a determination that the backup preference for the first availability group database replica is on-line.

16. The computer program product of claim 15, wherein the program code includes further instructions to:
identify any structured query language instances on the active node; and
determine whether the first availability group database replica is part of the structured query language instances on the active node, wherein logging in to the structured query language instance on the active node is in response to a determination that the first availability group database replica is part of the structured query language instances on the active node.

17. The computer program product of claim 16, wherein the program code includes further instructions to:
identify an owner node for the first availability group database replica in response to a determination that the first availability group database replica is not part of the structured query language instances on the active node, and
trigger a process on the owner node.

18. The computer program product of claim 15, wherein the program code includes further instructions to
identify a next backup preference for the first availability group database replica based on a priority table in response to a determination that the backup preference for the first availability group database replica is not on-line;
database replica identify the next backup preference for the first availability group as the preferred node for backing up the first availability group database replica in response to a determination that the next backup preference for the first availability group database replica is on-line.

19. The computer program product of claim 14, wherein the preferred node is identified for the second availability group database replica based on:
identifying a primary replica for the second availability group database replica;
identifying a backup preference for the second availability group database replica based on the primary replica for the second availability group database replica;
determining if the backup preference for the second availability group database replica is on-line; and
identifying the backup preference for the second availability group database replica as the preferred node for backing up the second availability group database replica in response to a determination that the backup preference for the second availability group database replica is on-line.

20. The computer program product of claim 15, wherein the program code includes further instructions to perform a full backup of the user-selected node prior to restoring the user-selected database replica to the user-selected node, wherein restoring the user-selected database replica to the user-selected node in the cluster of nodes is based on the full backup of the user-selected node performed prior to restoring the user-selected database replica to the user-selected node.

* * * * *